US012060716B2

(12) United States Patent
Hakeman et al.

(10) Patent No.: US 12,060,716 B2
(45) Date of Patent: Aug. 13, 2024

(54) INSTALLATION FEATURES FOR FENESTRATION UNITS AND ASSOCIATED METHODS

(71) Applicant: Pella Corporation, Pella, IA (US)

(72) Inventors: Matthew A. Hakeman, Pella, IA (US); Jaden P. Vos, Pella, IA (US)

(73) Assignee: Pella Corporation

( * ) Notice: Subject to any disclaimer, the term of this patent is extended or adjusted under 35 U.S.C. 154(b) by 0 days.

(21) Appl. No.: 17/663,546

(22) Filed: May 16, 2022

(65) Prior Publication Data

US 2022/0349190 A1 Nov. 3, 2022

Related U.S. Application Data

(62) Division of application No. 16/522,293, filed on Jul. 25, 2019, now Pat. No. 11,332,946.

(60) Provisional application No. 62/703,033, filed on Jul. 25, 2018.

(51) Int. Cl.
*E06B 1/60* (2006.01)
*E04B 1/38* (2006.01)
*E04F 21/00* (2006.01)

(52) U.S. Cl.
CPC .......... *E04F 21/0023* (2013.01); *E04B 1/388* (2023.08); *E06B 1/6015* (2013.01); *E04B 2001/389* (2023.08); *E06B 1/6069* (2013.01)

(58) Field of Classification Search
CPC .......... E06B 1/60; E06B 1/603; E06B 1/6069; E06B 1/6053; E06B 1/6015; E06B 1/6061; E06B 1/6046; E04F 21/0007; E04F 21/0015; E04F 21/0023; E04B 1/40; E04B 2001/5868; E04B 2001/405; E05D 1/06; E05D 1/04; Y10T 292/03; Y10T 292/68
USPC .......... 52/213, 214, 204.53, 204.55; 16/247; 49/380
See application file for complete search history.

(56) References Cited

U.S. PATENT DOCUMENTS

| | | | |
|---|---|---|---|
| 304,183 | A | 8/1884 | Davis |
| 396,327 | A | 1/1889 | Crane. |
| 1,377,349 | A | 5/1921 | Holder |
| 1,429,527 | A | 9/1922 | Paul |
| 1,651,392 | A | 12/1927 | Honigbaum |
| 1,668,564 | A | 5/1928 | Jenkins |
| 1,697,456 | A | 1/1929 | Carlson |
| 1,836,980 | A | 12/1931 | Marty |
| 1,881,778 | A | 10/1932 | Madsen |

(Continued)

FOREIGN PATENT DOCUMENTS

| | | | |
|---|---|---|---|
| DE | 202004002331 | U1 | 4/2004 |
| DE | 20311513 | U1 | 11/2004 |

(Continued)

OTHER PUBLICATIONS

Abstract: DE 20003819 U1 (Jul. 2001) (Year: 2001).

(Continued)

*Primary Examiner* — Kyle J. Walraed-Sullivan
(74) *Attorney, Agent, or Firm* — FAEGRE DRINKER BIDDLE & REATH

(57) ABSTRACT

Features and methods for use in connection with the installation of fenestration units. Embodiments include an installation bracket and method of use, pre-installed flashing tape, and a shim that can be broken to a desired length during shimming procedures.

7 Claims, 6 Drawing Sheets

(56) References Cited

U.S. PATENT DOCUMENTS 1,929,633 A 10/1933 Gifford
2,169,985 A 8/1939 Hiza
2,305,252 A 12/1942 Hayden
2,440,918 A 5/1948 Schiessl
2,497,515 A 2/1950 Pearse
2,624,067 A 1/1953 Tassell
2,700,441 A 1/1955 Cudini
2,728,956 A 1/1956 Jackson
2,879,660 A 3/1959 Reintjes
2,952,947 A 9/1960 White
3,189,137 A 6/1965 Harris
3,192,670 A 7/1965 Jones, III
3,205,982 A 9/1965 Chimienti
3,238,679 A 3/1966 Capoccia
3,250,049 A 5/1966 Sklar
3,255,484 A 6/1966 MacDonald
3,298,651 A 1/1967 Passer
3,320,705 A 5/1967 Downing, Jr.
3,375,627 A 4/1968 Bursiek et al.
3,430,385 A 3/1969 Biro
3,566,542 A 3/1971 Gillen et al.
3,571,996 A * 3/1971 Braswell ............... E06B 3/9885 49/505
3,585,770 A * 6/1971 Maizler ................ E06B 1/6061 403/231
3,599,379 A 8/1971 Tuska
3,681,876 A 8/1972 Linder et al.
3,690,079 A 9/1972 Hemminger
3,692,040 A 9/1972 Kundert
3,730,466 A 5/1973 Swanquist
3,741,068 A 6/1973 Andruskiewicz
3,780,209 A 12/1973 Schuplin
3,782,064 A 1/1974 Biebuyck et al.
3,811,150 A 5/1974 Chalmers
3,851,420 A 12/1974 Tibbetts
3,861,444 A 1/1975 Portwood
3,889,423 A 6/1975 Begin
3,919,815 A 11/1975 Alabaster
3,963,269 A 6/1976 Rosenberg
3,967,845 A 7/1976 Governale
4,001,972 A 1/1977 Hurwitz
4,034,514 A 7/1977 Cecil
4,055,923 A 11/1977 Biebuyck
4,080,763 A 3/1978 Naidus et al.
4,141,190 A 2/1979 Shimada
4,228,630 A 10/1980 Englert et al.
4,295,299 A 10/1981 Nelson
4,330,972 A 5/1982 Sailor
4,335,550 A 6/1982 Johnson
4,341,048 A 7/1982 Minter
4,387,542 A 6/1983 Wehr
4,406,300 A 9/1983 Wilson
4,448,007 A 5/1984 Adams
4,473,981 A 10/1984 Simpson
4,488,391 A 12/1984 Pavnica
4,489,517 A 12/1984 Young
4,555,882 A 12/1985 Moffitt et al.
4,607,457 A 8/1986 Shewchuk
4,608,800 A 9/1986 Fredette
4,621,478 A 11/1986 Phillips et al.
4,627,206 A 12/1986 Cox
4,637,183 A 1/1987 Metz
4,644,717 A 2/1987 Biebuyck
4,672,784 A 6/1987 Pohlar
4,691,487 A 9/1987 Kessler
4,713,922 A 12/1987 Ingold
4,715,152 A 12/1987 Tanikawa
4,731,952 A 3/1988 Mascotte
4,731,965 A 3/1988 Jensen
4,821,472 A 4/1989 Tix
4,840,002 A 6/1989 Lovgren
4,844,520 A 7/1989 Muller, Jr.
4,852,312 A 8/1989 Harbom
4,854,621 A 8/1989 Baldwin
4,887,407 A 12/1989 Nelson
4,918,786 A 4/1990 Perry
4,935,998 A 6/1990 Frazier et al.
4,958,469 A 9/1990 Plummer
4,986,044 A * 1/1991 Funari ...................... E06B 1/20 52/211
5,018,333 A 5/1991 Bruhm
5,026,581 A 6/1991 Shea et al.
5,042,199 A 8/1991 Schneider et al.
5,054,250 A 10/1991 Foss
5,127,690 A 7/1992 Kim et al.
5,157,881 A 10/1992 Tashman et al.
5,179,969 A 1/1993 Peterson
5,210,987 A 5/1993 Larkowski
5,299,399 A 4/1994 Baier et al.
5,319,884 A 6/1994 Bergeron
5,327,684 A 7/1994 Herbst
5,365,697 A 11/1994 Vanderpan
5,365,707 A 11/1994 Jones et al.
5,394,657 A 3/1995 Peterson
5,423,149 A 6/1995 Herbst
5,477,646 A 12/1995 Dietz et al.
5,483,771 A 1/1996 Herbst
5,524,391 A 6/1996 Joffe et al.
5,542,217 A 8/1996 Larivee, Jr.
5,570,917 A 11/1996 Cutrer
5,572,840 A 11/1996 Fast et al.
5,581,948 A 12/1996 Simonsen
5,619,836 A 4/1997 Rouch et al.
5,655,342 A * 8/1997 Guillemet ................. E06B 1/60 49/505
5,655,343 A * 8/1997 Seals ..................... E06B 1/6069 52/745.15
5,675,870 A 10/1997 Cooper
5,692,350 A * 12/1997 Murphy, Jr. .......... E06B 1/6084 411/533
5,701,780 A 12/1997 Ver Meer
5,722,207 A 3/1998 Anderson et al.
5,822,933 A 10/1998 Burroughs et al.
5,839,236 A 11/1998 Frey
5,853,838 A * 12/1998 Siems ................... E06B 1/6069 156/247
5,857,299 A 1/1999 Gyllenberg et al.
5,875,602 A 3/1999 Lappin et al.
5,890,331 A 4/1999 Hope
5,899,026 A 5/1999 Williams et al.
5,906,083 A 5/1999 Olsen et al.
5,921,038 A 7/1999 Burroughs et al.
5,927,039 A 7/1999 De Boer
5,934,828 A 8/1999 Hu et al.
5,937,597 A 8/1999 Sono et al.
5,966,878 A 10/1999 Freund
6,014,846 A 1/2000 Sono et al.
6,018,916 A 2/2000 Henry
6,044,611 A 4/2000 Brunett
6,076,310 A 6/2000 Kim
6,098,343 A 8/2000 Brown et al.
6,141,922 A 11/2000 Carlisle et al.
6,161,344 A 12/2000 Blanchett
6,170,198 B1 1/2001 Staples et al.
6,170,207 B1 1/2001 Saindon
6,185,792 B1 2/2001 Nelson et al.
6,216,402 B1 4/2001 Van de Laar
6,223,484 B1 5/2001 Minter
6,230,446 B1 * 5/2001 Chalich ................ E06B 1/6069 52/98
6,256,956 B1 7/2001 Davis
6,276,099 B1 8/2001 O'Shea
6,293,061 B1 9/2001 Horak, Jr.
6,357,200 B1 3/2002 Vanderpan
6,374,557 B1 4/2002 O'Donnell
6,381,911 B1 5/2002 Weiland
6,385,925 B1 5/2002 Wark
6,401,402 B1 6/2002 Williams
6,405,501 B1 6/2002 Cerrato
6,408,922 B2 6/2002 Desrochers
6,519,899 B1 2/2003 Hurzeler
6,526,709 B1 3/2003 Jacobsen
6,536,176 B1 3/2003 Nordgren et al.
6,550,210 B1 4/2003 Levine et al.

(56) References Cited

U.S. PATENT DOCUMENTS 6,581,333 B2 6/2003 Kimball
6,615,500 B2 9/2003 Hale et al.
6,634,146 B2 10/2003 Carlson
6,722,089 B2 4/2004 Budzinski
6,725,610 B2 4/2004 Murphy et al.
6,823,633 B2 11/2004 Ryan
6,832,457 B2 12/2004 Geiger
6,894,083 B2 5/2005 Braun et al.
6,895,718 B2 5/2005 Moffatt
6,981,301 B2 1/2006 Medina et al.
7,100,337 B1 9/2006 Nordgren et al.
7,134,246 B1 11/2006 Olberding et al.
7,156,431 B2 * 1/2007 Norgaard .............. E06B 3/5409 292/342
7,162,841 B2 1/2007 Kownacki
7,237,365 B1 7/2007 Phandanouvong
7,367,164 B2 5/2008 Burton et al.
7,490,441 B2 2/2009 Burton et al.
7,600,346 B2 10/2009 Meeks
7,669,382 B2 3/2010 Burton et al.
7,814,716 B2 10/2010 Moffatt
7,930,860 B2 4/2011 Sawada
7,980,032 B2 7/2011 Moffatt
8,006,445 B2 8/2011 Burton et al.
8,333,359 B2 12/2012 Gordon
8,448,384 B2 5/2013 Wernlund et al.
8,621,795 B2 1/2014 Peterson
8,667,765 B1 3/2014 McCarthy
8,806,819 B1 * 8/2014 Teilborg .................... E06B 1/18 49/505
8,813,437 B1 * 8/2014 Spofford ............... E06B 1/6069 52/213
8,833,035 B2 9/2014 Vos et al.
8,973,315 B2 3/2015 Massey
9,145,673 B1 9/2015 Dantzer
9,556,665 B2 1/2017 Ritzert et al.
9,933,000 B2 4/2018 Conway et al.
10,125,533 B1 * 11/2018 Stathis ...................... E06B 1/68
11,332,946 B2 5/2022 Hakeman et al.
2001/0034984 A1 11/2001 Murphy et al.
2002/0108326 A1 8/2002 Ackerman
2002/0157328 A1 10/2002 Holder
2003/0145531 A1 * 8/2003 Holder ..................... F16M 7/00 52/98
2003/0177699 A1 9/2003 Fukuro et al.
2003/0177710 A1 9/2003 Gatherum
2003/0177711 A1 9/2003 Gatherum
2003/0177712 A1 9/2003 Gatherum
2003/0177725 A1 9/2003 Gatherum
2003/0177726 A1 9/2003 Gatherum et al.
2003/0177727 A1 9/2003 Gatherum
2003/0188498 A1 10/2003 Lewkowitz
2004/0020143 A1 2/2004 Webb
2004/0237443 A1 12/2004 Haley et al.
2005/0050815 A1 3/2005 Engebretson
2005/0097837 A1 5/2005 Burton
2005/0138875 A1 6/2005 Grunewald et al.
2005/0144856 A1 7/2005 Conlin
2005/0144865 A1 7/2005 Ellingson
2005/0188625 A1 9/2005 Cantrell
2005/0193654 A1 9/2005 Primozich
2005/0235571 A1 10/2005 Ewing et al.
2005/0262771 A1 12/2005 Gorman
2005/0262782 A1 12/2005 Harrison et al.
2005/0268449 A1 12/2005 Medina et al.
2006/0080894 A1 4/2006 Saelzer
2006/0101726 A1 5/2006 Collins
2006/0137262 A1 6/2006 Crowder-Moore et al.
2006/0150524 A1 7/2006 Kibbel et al.
2006/0213135 A1 * 9/2006 Mathes ................. E06B 1/6069 52/204.55
2006/0230593 A1 10/2006 Eggen et al.
2006/0236618 A1 10/2006 Williams
2006/0272238 A1 12/2006 Honda
2006/0272274 A1 12/2006 Burton et al.
2007/0056231 A1 3/2007 Dimario et al.
2007/0094957 A1 5/2007 Burton et al.
2007/0125013 A1 6/2007 Prince
2007/0166498 A1 7/2007 Penar
2007/0169425 A2 7/2007 Takagi et al.
2007/0214738 A1 9/2007 Koessler
2008/0054137 A1 3/2008 Poulin
2008/0110110 A1 5/2008 Burton et al.
2008/0127564 A1 6/2008 Burton et al.
2008/0178557 A1 7/2008 Parsons et al.
2009/0025312 A1 1/2009 Deans et al.
2009/0049780 A1 2/2009 Pulte et al.
2009/0183453 A1 7/2009 Koessler et al.
2009/0272045 A1 11/2009 Teodorovich
2010/0139178 A1 6/2010 Ehrman et al.
2010/0170186 A1 7/2010 Hohmann, Jr.
2010/0281787 A1 11/2010 Jay et al.
2012/0049022 A1 3/2012 Coyle
2012/0186665 A1 7/2012 Vos et al.
2014/0331575 A1 11/2014 Vos et al.
2015/0361653 A1 12/2015 Grant et al.
2017/0114536 A1 * 4/2017 Tebo ................. E04F 15/02183
2018/0058135 A1 3/2018 Vos
2019/0136606 A1 * 5/2019 Grobelny .............. E06B 1/6069
2020/0032527 A1 1/2020 Hakeman et al.
2020/0318418 A1 * 10/2020 Burger .................. E06B 1/6084
2021/0047829 A1 2/2021 Anderson

FOREIGN PATENT DOCUMENTS

DE 102011002245 A1 10/2012
DE 202016101375 U1 3/2016
EP 1318261 A2 6/2003
EP 2226456 A1 9/2010
EP 2631405 A1 8/2013
KR 20-0438474 Y1 2/2008
KR 20-0439125 Y1 3/2008
KR 10-0981307 B1 9/2010
KR 10-1019219 B1 3/2011
KR 2017-0000040 U 1/2017
KR 2017-0000826 A 1/2017

OTHER PUBLICATIONS

Abstract: KR 1802838 B1 (Dec. 2017) (Year: 2017).
Abstract: KR 2007070136 A (Jul. 2007) (Year: 2007).
Abstract: KR 2008030592 A, (Apr. 2008) (Year: 2008).
Abstract: KR 2010007525 U (Jul. 2010) (Year: 2010).
Abstract: KR 2010034444 A (Apr. 2010) (Year: 2010).
Abstract: KR 2010098761 A (Sep. 2010) (Year: 2010).
Abstract: KR 2014004646 U (Aug. 2014) (Year: 2014).
Abstract: KR 2014026916 A (Mar. 2014) (Year: 2014).
Abstract: KR 471050 Y1 (Jan. 2014) (Year: 2014).
Abstract: KR 690587 81 (Mar. 2007) (Year: 2007).
Abstract: KR2011006645 U (Jun. 2011) (Year: 2011).
Abstract: KR2011011760 U (Dec. 2011) (Year: 2011).
Clad Casement & Awning Window Installation Instructions, 5 pages, .COPYRGT. Pella Corporation, 2004.
Clad Double-Hung Window Installation Instructions, 5 pages, COPYRGT. Pella Corporation, 2004.
Installation Instruction: HurricaneShield.TM. / Advanced Performance Casement and Awning Windows, 4 pages, .COPYRGT. Pella Corporation, 2001.
Installation Instructions for New Construction Vinyl Window with Integral Nailing Fin, JELD-WEN Windows & Doors, copyright 2003, 6 pages.
Jamsill, Inc.; Jamsill Guard. TM., 5 pages, .COPYRGT. 2005, http://www.jamsill.com/Products.php.
Pella Corporation, Clad Frame Entry Door Installation Instructions, 5 pages, 2003.
Pella Corporation, “Entry Door—Wood and Clad Double Door installation instructions”, 5 pages, 2003.
Pella Corporation, Product Brochure, Part No. 801P0004 2003.
Pella Corporation, Wood Frame Entry Door & 20 Minute Fire Rated Entry Door Installation Instructions, 5 pages, 2003.

(56) References Cited

OTHER PUBLICATIONS

US Provisional Application filed Oct. 14, 2005, 19 pages, U.S. Appl. No. 60/726,573.
Wood Window Installation, New Wood Frame Construction, Marvin Windows and Doors, Dec. 12, 2006, 13 pages.

* cited by examiner

INSTALLATION FEATURES FOR FENESTRATION UNITS AND ASSOCIATED METHODS

REFERENCE TO RELATED APPLICATION

This application is a divisional of U.S. patent application Ser. No. 16/522,293, filed Jul. 25, 2019, entitled Installation Features for Fenestration Units and Associated Methods, which claims the benefit of U.S. Provisional Application Ser. No. 62/703,033 filed Jul. 25, 2018 and entitled Installation Features for Fenestration Units and Associated Methods, which are incorporated herein by reference in its entirety and for all purposes.

FIELD

The present disclosure relates generally to fenestration units. Disclosed examples include windows and doors.

BACKGROUND

Fenestration units such as windows and doors are generally known. Fenestration units of these types are typically manufactured for installation into buildings or other structures. There remains a continuing need for improved fenestration units. For example, fenestration units that enable efficient, accurate and/or structurally sound installation would be desirable.

SUMMARY

Some aspects of the instant disclosure relate to continuous, pre-applied (e.g., factory applied) flashing tape that wraps around some or all of the frame of a fenestration unit (e.g., door or window) and is applied to the building structure in which the fenestration unit is installed. In some examples, the tape is flexible and configured to provide a continuous seal around the sides and top of the fenestration unit (e.g., with house wrap or other building structure cladding). The tape may include a backing layer that faces away from the building structure that is not removed and is made of a relative stiff, or resilient material (e.g., metallic foil, such as aluminum foil). The backing layer may help with handling of the tape (e.g., to reduce instances of the tape sticking to itself) during the installation process. The backing layer may be perforated (e.g., holes, slits, or other perforations) to permit portions of the tape to fracture and/or flex during the installation process (e.g., during bending of the tape when it transitioned from a first, lower profile configuration to a second radial configuration for application to the building structure). In some examples, the perforations are formed at selected areas to promote predictable fracture and/or flex locations on the tape (e.g., corresponding to the corners of the fenestration unit). The flashing tape may additionally or alternatively include a carrier layer formed of an elastomeric material to facilitate an ability of the flashing tape to conform, or be molded around the fenestration unit and to be folded from a shipping configuration to an installation configuration to provide the desired seal.

Other aspects relate to the provision of pre-cut flashing tape for the sill of the fenestration unit (e.g., sill of a window) that is shipped with the fenestration unit. The flashing tape may be of any known, or to be realized type, but pre-cut to the recommended installation width for the type of fenestration unit being installed. In some examples, such features help achieve use of flashing tape at the recommended width for a particular product type, without the need to custom cut tape as part of installation.

Other aspects relate to pre-applied (e.g., factory applied) installation brackets that are secured to the frame of the fenestration unit. In some examples, the installation brackets fold out from a first, lower profile configuration (e.g., flat against the frame) to a second, radial configuration (e.g., 90 degrees relative to the frame). The installation brackets may be configured to permit shimming of the fenestration unit during installation from the exterior of the building structure. In some examples, the assembler (e.g., manufacturer of the fenestration unit) pre-selects the bracket locations, and thus, the locations at which the installer applies fasteners to secure the fenestration unit to the building structure. The brackets may include indicia, or simply a selected number of fastener apertures, that indicate to the installer how many fasteners should be used and/or where to install the desired number of fasteners. In some applications, by facilitating shimming the fenestration unit from the exterior of the building structure (normally, such a process is performed from the building structure interior), the time spent on each install can be reduced, proper shimming techniques (e.g., number of shims and shim locations), and increased fenestration unit performance (e.g., reduced water infiltration) may be achieved.

Still other aspects relate to a shim design that facilitates installation of fenestration units. In some examples, the shim has a relatively steeper angle than standard shims (e.g., compare approximately 2 degrees for a standard shim to approximately 9.5 degrees according to some shim designs disclosed herein). For example, the shim may have dimensions of 0.5 inches in height, 3 inches in length, and 1 inch in width. The shim may additionally or alternatively include grooves, or reliefs across the width of the shim to facilitate breaking the shim at pre-selected locations along the length of the shim.

Examples include a factory applied stamped steel base with a flip up bracket which provides a means to shim a product properly from the exterior, center the product within the rough opening, anchor the product properly for structural performance, and eliminate the need for additional laborer room side/within the building. Other examples include a method for installing fenestration units according to the disclosed examples, using the installation features according to their described operations.

Examples include continuous factory applied flashing tape that warps up on to the frame at the correct location. This tape is flexible to provide a continuous seal around the window frame. The backing of the tape that faces the exterior of the home (not removed) may be made of a stiff material (like aluminum foil) that helps to reduce the chance of the tape sticking to itself during the installation process. The foil tape may be perforated to allow it to fracture during the installation process at a predicable location as the tape is applied.

Examples include factory applied installation brackets that fold out to 90 degrees and allow shimming from the exterior. These brackets are placed at locations dictated by the fenestration unit manufacturer, that illustrate where to fasten and how many fasteners to apply. Shimming from the exterior (normally done from the interior) will reduce the time spent on each install and helps encourage proper shimming for all windows. This may increase the performance of windows and help to reduce isolated incidents of water infiltration.

Examples include pre-cut flashing tape for the sill of the window that ships with the unit. This flashing tape can be pre-cut to the recommended width to install with products correctly without needing additional rolls of tape on the job site.

Disclosed examples include an installation bracket base for use with a fenestration unit, comprising: a fastening portion configured to be fastened to a frame of a fenestration unit; a tongue deflectably coupled to the fastening portion, wherein the tongue defines a shim receiver gap extending between an exterior-facing side and an interior-facing side of the installation bracket between the tongue and the fastening portion. The installation bracket base may further include a leg deflectably coupling the tongue to the fastening portion. The installation bracket base may further include two spaced-apart legs deflectably coupling the tongue to the fastening portion, wherein the two legs define a slot and wherein the shim receiver gap extends through the slot.

In examples, the installation bracket base may further include one or more fastener openings in the fastener portion. In examples, the installation bracket base is fabricated from single piece of material. Examples may also include an anchoring bracket extending from the fastening portion of the installation bracket base, where the anchoring bracket is configured to be anchored to a structure. In examples, the anchoring bracket is hingedly connected to the base. In examples, the anchoring bracket includes two spaced-apart legs defining a gap, and wherein the shim receiver gap extends through the gap between the legs of the anchoring bracket. In examples, the anchoring bracket is hingedly connected to the exterior-facing side of the installation bracket base. Examples also include a fenestration unit including one of more installation brackets in accordance with examples of the types described above mounted thereto.

Examples also include an installation bracket for use with a fenestration unit, comprising: a base fabricated from a single piece of material, including: a fastening portion including one or more fastener openings; a tongue; and a leg deflectably coupling the tongue to the fastening portion, wherein the tongue and leg define a shim receiver gap extending between an exterior-facing side and an interior-facing side of the installation bracket between the tongue and the fastening portion; and a flip-up anchoring bracket hingedly coupled to the exterior-facing side of the installation bracket, the anchoring bracket including a leg configured to be anchored to a structure and defining a gap, and wherein the shim receiver gap extends through the gap of the anchoring bracket. Examples also include a fenestration unit including one of more installation brackets in accordance with examples of the types described above mounted thereto.

Disclosed examples also include a method for installing a fenestration unit into a rough opening of a structure, wherein the fenestration unit includes a frame having an installation bracket including a deflectable tongue and optionally any or all other features described above, comprising: inserting the fenestration unit into the rough opening with the deflectable tongue between the frame and the structure; inserting a shim between the frame and the deflectable tongue to deflect the tongue toward the structure; and anchoring the inserted fenestration unit to the structure after inserting the shim. In examples, inserting the shim may include inserting the shim from the exterior side of the structure. In examples, inserting the fenestration unit includes inserting the fenestration unit into the rough opening from the exterior side of the structure. In examples, inserting the shim includes causing the tongue to hold the shim. In examples, the installation bracket includes a leg deflectably coupling the tongue to the frame, and wherein inserting the shim includes supporting the shim on the leg. In examples, the installation bracket includes a fastening bracket, and wherein anchoring the inserted fenestration unit to the structure includes fastening the fastening bracket to the structure.

Disclosed examples also include a fenestration unit with pre-attached flashing tape configured for installation into a structure (with or without any or all of the installation bracket features described above), comprising: a frame including a head, a first jamb, a second jamb, and a sill; and flashing tape attached to the frame and extending from one or more of the head, first jamb, second jamb and sill, including: one or more structural layers; an adhesive layer; and a release liner on the adhesive layer opposite the adhesive layer from the one or more structural layers; and wherein during installation of the fenestration unit into the structure, the release liner can be removed from the flashing tape to expose the adhesive layer and allow the flashing tape to be attached to the structure by the adhesive layer.

In examples, the flashing tape extends around a perimeter of the frame from the head, the first jamb and the second jamb. In examples, the sill of the frame is free of the flashing tape. Examples also include a section of flashing tape configured to be attached to the sill of the frame during installation of the fenestration unit, comprising: one or more structural layers; an adhesive layer; and a release liner on the adhesive layer opposite the one or more structural layers; and wherein during installation of the fenestration unit into the structure, the release liner can be removed from the section of flashing tape to expose the adhesive layer and allow the section of flashing tape to be attached to the structure by the adhesive layer. In examples, the flashing tape extends around a perimeter of the frame, including from the head, first jamb, second jamb and sill. In examples, the flashing tape is a single, continuous piece of material. Examples further include perforation structures to enable the flashing tape to be folded. In embodiments, the flashing tape is folded toward the frame into a shipping configuration, wherein the flashing tape can be unfolded from the shipping configuration for installation of the fenestration unit into the structure. In examples, the adhesive layer attaches the flashing tape to the frame. Examples further include one or more fracture structures on the flashing tape to enable the tape to be fractured at predictable locations during installation of the fenestration unit.

Disclosed examples also include a pre-cut section of flashing tape configured to be mounted to a frame of a fenestration unit (with or without any or all of the installation bracket features described above), comprising: a mounting section configured to the attached to one or more of a header, a first jamb, a second jamb or a sill of a fenestration unit frame; and an extending section configured to extend from the mounting section beyond the one or more of the header, first jamb, second jamb or sill of the fenestration unit frame; wherein the mounting section and extending section include: one or more structural layers; an adhesive layer; and a release liner on the adhesive layer opposite the one or more structural layers; and wherein the release liner can be removed from the mounting section to enable the mounting section of the flashing tape to be attached to the fenestration unit frame; and wherein the release liner can be removed from the extending section to enable the extending section of the flashing tape to be attached to a structure into which the fenestration unit frame is being installed. Examples further include a slit in the release liner between the mounting section and the extending section, to enable removal of the release liner from the mounting section while enabling the release liner to remain on the extending section.

Disclosed embodiments also include a shim for shimming a fenestration unit (with or without any or all of the installation bracket features and method and/or flashing tape features described above), comprising: a body having a top and a bottom that are angled with regard to one another, and a nose and a heel defining a length, wherein the body tapers in thickness between the nose and the heel; and a plurality of break-facilitating structures in the body at spaced apart locations along the length. In examples, the shim may include hollows between the break-facilitating structures.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

DETAILED DESCRIPTION

Figure 2:
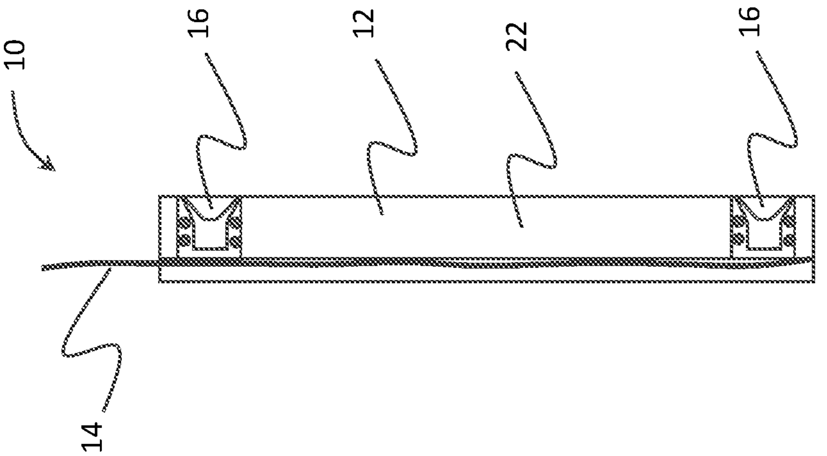
FIG. 2 is a schematic representation of a fenestration unit as viewed from an edge, or side of the unit prior to installation in a building structure, according to some examples.
Figure 1:
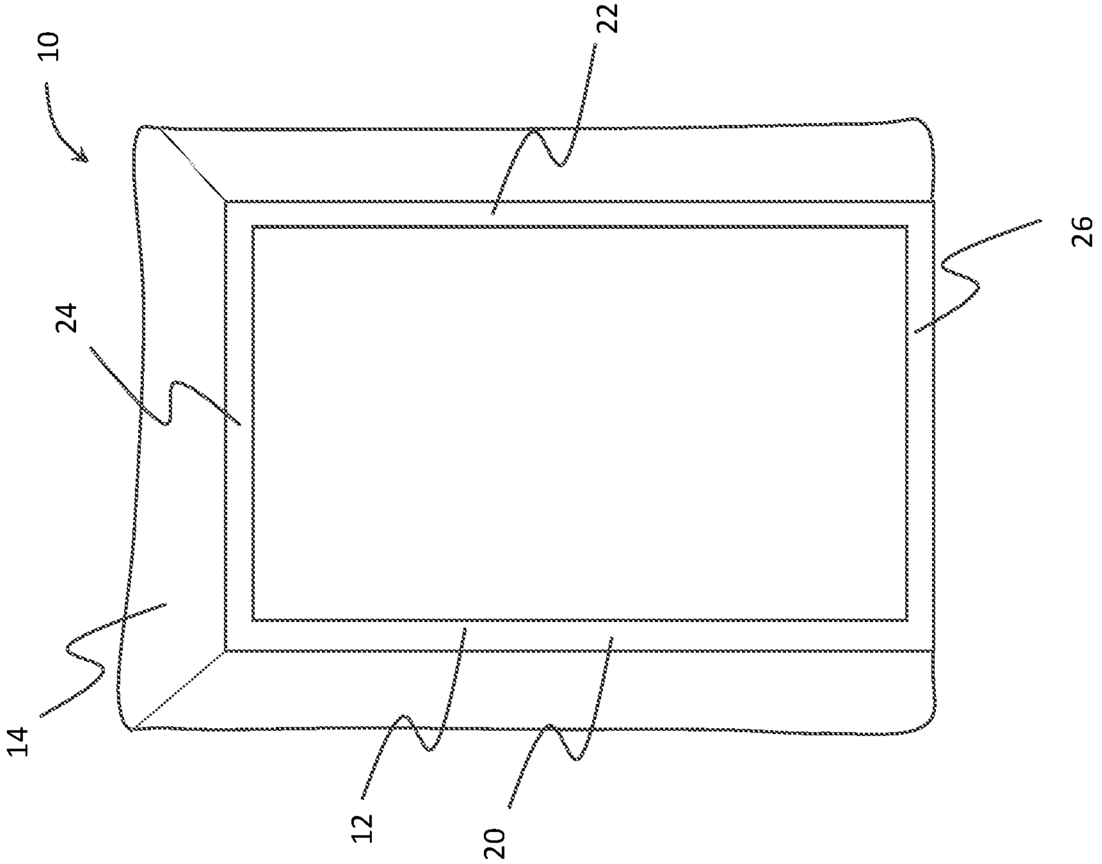
FIG. 1 is a schematic representation of a fenestration unit as viewed from an exterior side prior to installation in a building structure, according to some examples.

FIG. 1 is a schematic representation of a fenestration unit 10 as viewed from an exterior side prior to installation in a building structure (not shown), according to some examples. FIG. 2 is a schematic representation of a fenestration unit 10 as viewed from an edge, or side of the unit 10 prior to installation in a building structure, according to some examples. The term "fenestration unit" is meant to cover any of a variety of products for providing venting, viewing, ingress, or egress from a building structure into which the fenestration unit is installed. Examples include doors, windows, and the like. The term "building structure" is meant to cover any of a variety of structures. Examples include personal homes, residential buildings, commercial buildings, and others. As shown in FIGS. 1 and 2, the fenestration unit 10 includes a frame 12, flashing tape 14, and a plurality of installation brackets 16. Relative terms such as "upper," "lower," "top," "bottom," and the like are to be construed broadly and are used to describe the orientation of components relative to one another, rather than in an absolute sense, unless otherwise indicated.

The frame 12 can be configured to maintain one or more glazing or other panels (e.g., sheets of glass). An example of a suitable frame design corresponds to those used for the products sold under the trade name "ARCHITECT SERIES" by "PELLA CORPORATION" having facilities located in Pella, Iowa. As shown in FIG. 1, the frame 12 optionally includes two side jambs 20 and 22, a head 24, and a sill 26.

The flashing tape 14 is optionally a single, continuous piece of material (e.g., integral or separate, connected components) or formed of separate and discrete pieces of material, and extends around the perimeter of the frame 12, for example being attached to each of the side jambs 20 and 22 and the head 24 as desired. Generally, the flashing tape 14 will be a single, continuous piece of material to facilitate proper sealing. Additionally, the sill 26 is typically left free of the pre-installed flashing tape 14, with a subsequent piece (or pieces) of tape similar to flashing tape 14 applied during installation. In some shipping kits, a length of pre-cut flashing tape of a proper width (and, e.g., length) is included with the unit 10 for installation along the sill 26. In some examples, however, the sill 26 may also include a portion of the pre-installed flashing tape 14 (e.g., such that the flashing tape 14 forms a continuous ring).

In some examples, the flashing tape 14 is pre-attached to the fenestration unit 10 (e.g., at the manufacturing location) prior to installation of the fenestration unit 10 in a building structure. Thus, in some examples, the fenestration unit 10 includes the flashing tape 14 when the fenestration unit is in a shipping configuration (e.g., wrapped with shrink wrap, contained in a shipping container, and/or while coupled with other additional or alternative shipping aids). In some examples the flashing tape 14 is applied directly to an exterior surface of the frame 12 (e.g., adhered to the frame 12) and in other examples the flashing tape 14 is additionally or alternatively received between portions of the frame 12 (e.g., between frame cladding and the frame jamb) to secure the flashing tape 14 to the fenestration unit 10.

Figure 3:
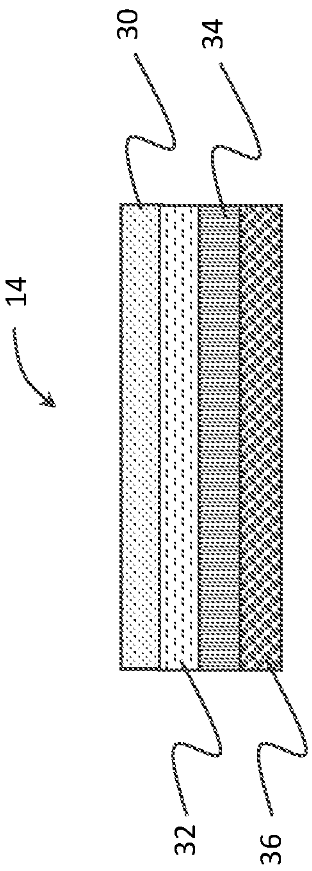
FIG. 3 is schematic view of a cross-section of flashing tape for a fenestration unit, according to some examples.

FIG. 3 is a schematic view of a cross-section of the flashing tape 14. As shown the flashing tape 14 includes a release liner 30 (e.g., craft paper), an adhesive layer 32 (e.g., butyl), and one or more structural layers such as a carrier layer 34 (e.g., ethylene propylene diene monomer rubber, EPDM), and a backing layer 36 (e.g., aluminum foil).

The release liner 30 is optionally slit at a desired width to facilitate assembly to the frame 12 (e.g., by removing a portion of the release liner 30 and adhering the flashing tape 14 to the frame 12 with the adhesive layer 32.

The adhesive layer 32 is optionally a butyl adhesive, but can be any of a variety of adhesive formulations suitable for such purposes.

The carrier layer 34 is preferable formed of an elastomeric material (e.g., EPDM) to facilitate flexing and limited stretching/conformability of the flashing tape 14 during shipping (e.g., to facilitate folding the flashing tape 14 against the remainder of the fenestration unit 10) and during installation (e.g., to facilitate folding the flashing tape 14 outward and then against the outer surface (e.g., cladding or building wrap) of the building structure into which the fenestration unit 10 is installed. Such a feature can be particularly useful for ensuring proper folding and sealing at the corners of the fenestration unit 10, for example.

Figure 5:
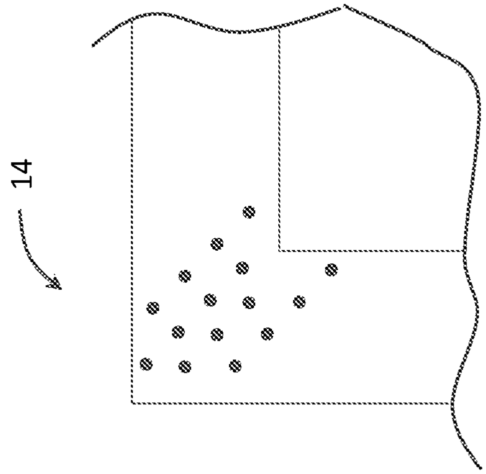
FIGS. 4-7 are detailed illustrations of the flashing tape shown in FIG. 3, showing perforation patterns in accordance with examples.
Figure 4:
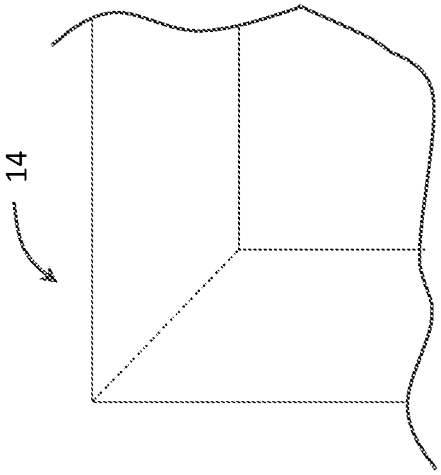
Figure 7:
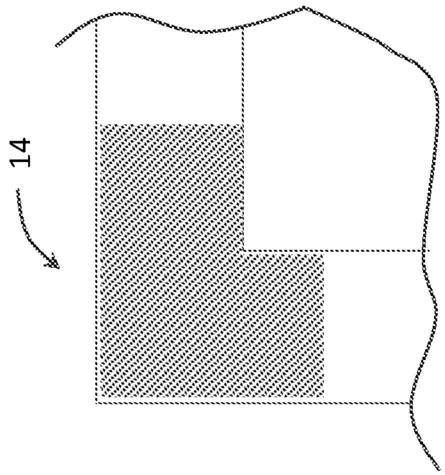
Figure 6:
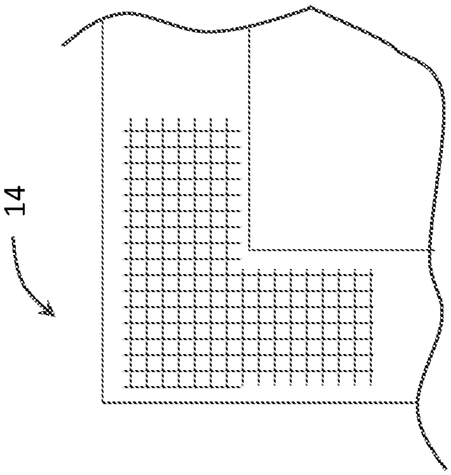

In some examples, the backing layer 36 is formed of a material that provides good handling characteristics and some overall stiffness to the flashing tape 14 (e.g., a metallic foil, such as aluminum foil). In some examples, the backing layer 36 includes one or more relief features (e.g., perforations, apertures, slits, or other features providing selective flexibility). Several examples of potential patterns are shown schematically, such as one or more perforated lines at the corners (FIG. 4), a pattern of holes (FIG. 5), a slit cross-hatching (FIG. 6), or a series of slits—angled or otherwise (FIG. 7), or any other additional or alternative pattern of diagonal, horizontal, vertical, or checkerboard patterns, for example, as desired. Any of these options, similar options, and combinations thereof are contemplated. Such relief features may assist with the overall ability of the flashing tape 14 to be folded as desired (e.g., for shipping purposes) without defeating the enhanced handling provided by such a layer. The corners or other portions of the flashing tape 14 may be beneficially prepared with such features. In some examples, the backing layer 36 may be offset or have a smaller width than other components of the flashing tape 14 (e.g., there may be foil along only part of the width of the flashing tape 14) to facilitate a desired level of conformity with the flashing tape 14 while balancing the need for proper handling characteristics (e.g., the flashing tape 14 does not easily flop over onto itself to self-adhere).

In some examples, the flashing tape 14 is sufficiently bi-directionally flexible/stretchable such that the backing layer 36 does not require any perforations/relief features at the corners (or elsewhere, in some examples). Regardless, in a typical installation, once the release liner 30 is removed, the flashing tape 14 can be stretched up and onto the wall of the building structure (not shown). The release liner 14 can be slit (e.g., at a width of about 0.5 inches) to allow removal of part of the release liner 14 for applying the flashing tape 14 to the frame 12 during manufacture (or otherwise prior to installation), and a remainder of the liner 14 may stay in place until removed during installation in the building structure.

Figure 8:
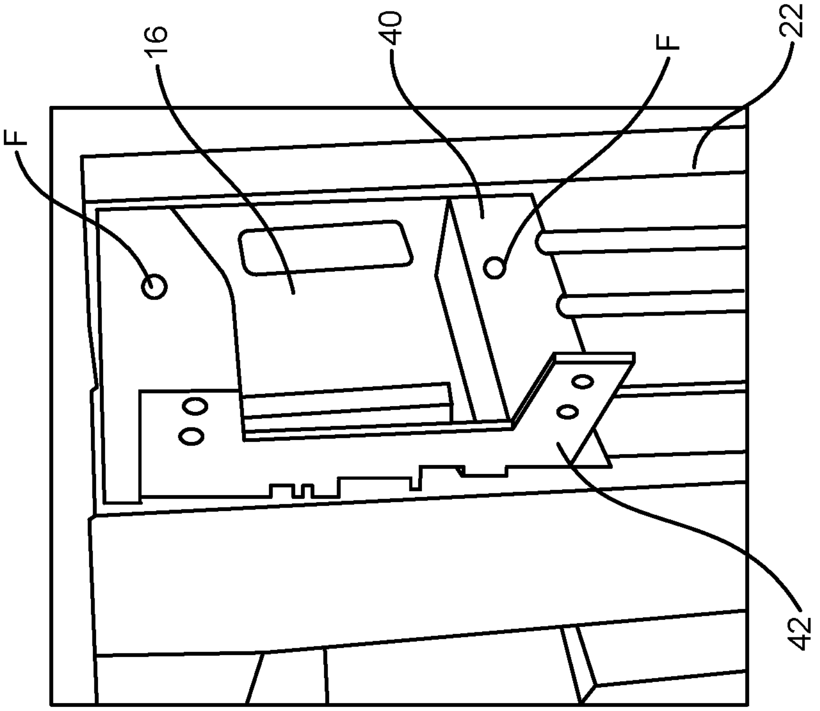
FIG. 8 is an isometric illustration of a portion of a fenestration unit including an installation bracket, according to some examples.

FIG. 8 shows one of the installation brackets 16 installed on the jamb 22 of the frame 12, according to some embodiments (note the flashing tape 14 is removed from the view of FIG. 8 to allow viewing of the bracket 16 as installed). As shown, the installation brackets 16 may be secured to the frame using one or more fasteners F (e.g., screws or nails) received through fastener openings in fastening portions of the installation brackets 16.

The installation brackets 16 are attached at pre-selected locations about the frame 12 (e.g., at or near the corners). The installation brackets 16 are optionally formed of stamped steel or other material as desired. Each installation bracket 16 optionally includes a base 40 and a flip-up bracket 42. Generally, the number and position of the installation brackets 16, as well as the configuration of the base 40 and flip-up bracket 42, are selected about the fenestration unit 10 such that structural anchoring is sufficient for a desired performance rating. Generally a minimum of two of the brackets 16 will be located near each lower corner on the sill 26 (e.g., to provide the needed space to allow proper moisture management and means to shim one or both sides of the fenestration unit 10 during plumbing/levelling). Generally, additional ones of the brackets 16 would be located at each checkrail for double hung windows as well as near the upper corners on the jambs 20 and 22 of all fenestration units 10.

Figure 9:
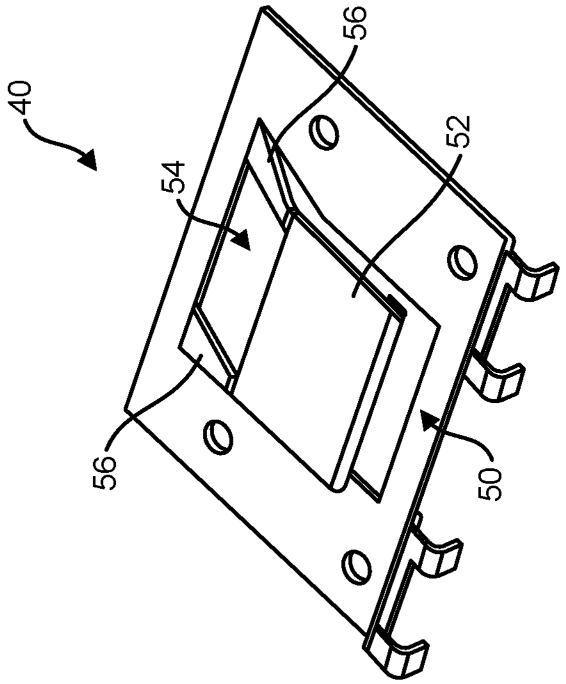
FIG. 9 is an isometric illustration of a portion of the installation bracket shown in FIG. 8.

FIG. 9 is an isometric view of the base 40, according to some examples. As shown, the base 40 includes a shim receiver 50, formed by a deflectable tongue 52 and a slot 54. The deflectable tongue 52 is coupled to a remainder of the base 40 with a pair of legs 56, which also help form the boundaries of the slot 54. Generally, the base 40 permits a shim (not shown) to be inserted narrow end first, from the exterior of the fenestration unit 10, under the deflectable tongue 52 and into the slot 54. This can help hold the shim during shimming, and also permits gradual insertion of the shim and thus plumbing of the unit 10. In some examples, the incline towards the interior of the base's shim receiver 50 facilitates self-centering of the unit 10 within a rough opening (not shown). Such self-centering can help reduce or eliminate the need for an additional person/labor within the interior of the building structure to assist with centering or shimming of the unit 10.

The base 40 can be provided as a standalone unit, or used in conjunction with the flip-up bracket 42, described below.

Figure 10:
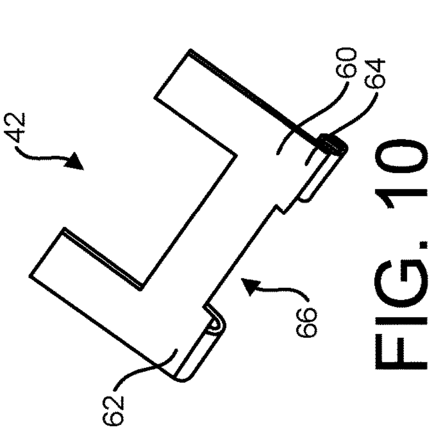
FIG. 10 is an isometric illustration of another flip-up bracket of the installation bracket shown in FIG. 9, according to some examples.

FIG. 10 is an isometric view of the flip-up anchoring bracket 42, according to some examples. As show, the flip-up bracket 42 is optionally U-shaped with a pair of attachment legs 60 and 62 each having a desired number of apertures for receiving fasteners (e.g., screws or nails). The flip up bracket 42 has an inner portion 64 that is configured to be hinged (e.g., using one or more pins) to the base 40 and which also defines a gap 66 with the base 40. In some examples, the gap 66 in the flip-up bracket 42 and the gap under the tongue 52 of the shim receiver 50 (FIG. 9) help allow for the insertion of a wedge shim (not shown) from the exterior of the building structure (not shown) for shimming the fenestration unit 10. This shimming capability can help allow for easier unit leveling using the unit's frame 12 as a guide as well as eliminate the need for a person/laborer on the interior of the building structure during levelling.

Additionally, the isolated flip-up bracket 42 (i.e., isolated in the sense there are discrete locations corresponding to each of the installation brackets 16, rather than a continuous, or relatively longer nail flange extending along the frame 12) can help reduce the number of anchor fasteners that are required, or which an installer perceives as being required, around the entire perimeter of the unit 10. In other words, an installer might otherwise believe that more fasteners than necessary are required when utilizing a standard nailing flange for installation of a similar unit to that of unit 10.

Figure 11:
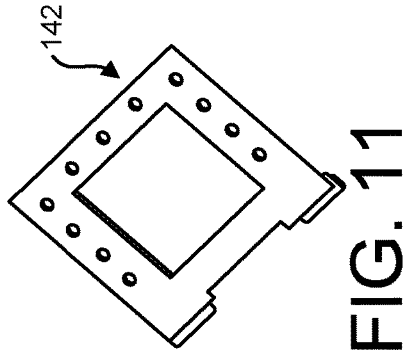
FIG. 11 is an isometric illustration of another flip-up bracket of the installation bracket shown in FIG. 9, according to some examples.

FIG. 11 is an isometric view of another example of a flip-up bracket 142 optionally employed with one, some, or all of the installation brackets 16 of the fenestration unit 10 as desired. As shown, the flip-up bracket 142 has a square-annular, or ring-shape (e.g., as opposed to the U-shape of FIG. 10) and includes additional fastener apertures.

Figure 12:
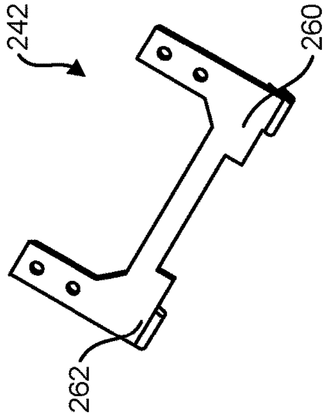
FIG. 12 is an isometric illustration of another flip-up bracket of the installation bracket shown in FIG. 9, according to some examples.

FIG. 12 is an isometric view of another example of a flip-up bracket 242 optionally employed with one, some, or all of the installation brackets 16 of the fenestration unit 10 as desired. As shown, the flip-up bracket 242 has is relatively longer and defines a U-shape including legs 260 and 262. A longer flip-up bracket may help facilitate anchoring with pre-applied brickmould, and thus help eliminating the requirement to remove some or a portion (e.g., 3½ inches) of brickmould in the field to properly anchor mullion ends of the unit 10 and a unit to which the unit 10 is mulled.

Figure 13:
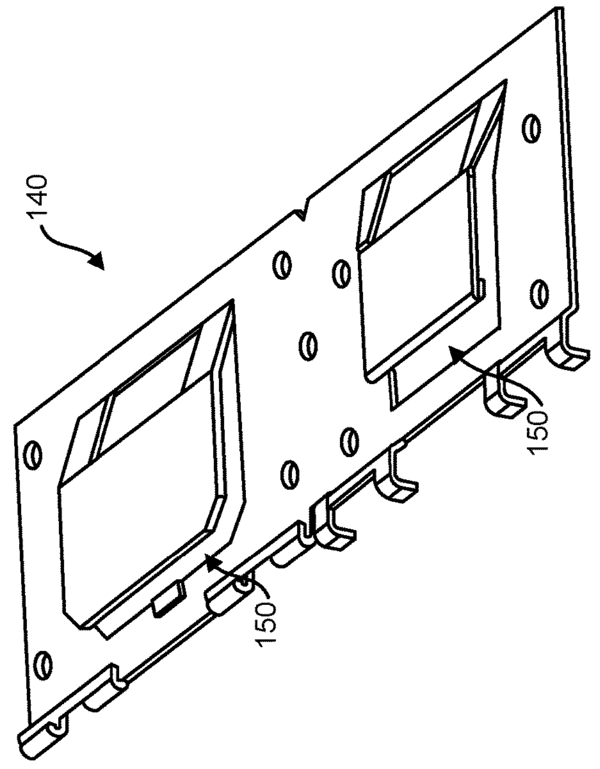
FIG. 13 is an isometric illustration of another installation bracket, according to some examples.

FIG. 13 is an isometric view of another example of an installation bracket base 140 that may be utilized for one, some, or all of the installation brackets 16 of the fenestration unit 10 as desired. As shown, the base 140 is relatively longer than the base 40, and includes dual shim receivers 150 with associated mounting locations for flip-up brackets, such as any of those previously described. In some examples, the base 140 serves as a mullion end reinforcement plate and as a means of mullion anchoring to the rough opening in which the fenestration unit 10 and another fenestration unit (not shown) are installed as a mulled assembly, or unit.

Various additional or alternative modifications to the installation brackets 16 are contemplated. For example, for block frame installation methods that utilize masonry installation clips, the base (such as any of those previously described) and flip-up bracket (such as any of those previously described) could be reversed, allowing for insertion of the unit 10 from the interior of the building structure. If desired, a longer, modified flip-up bracket could then be anchored into the rough opening (e.g., similar to installation clip anchoring in either straight or bent condition).

Figure 14:
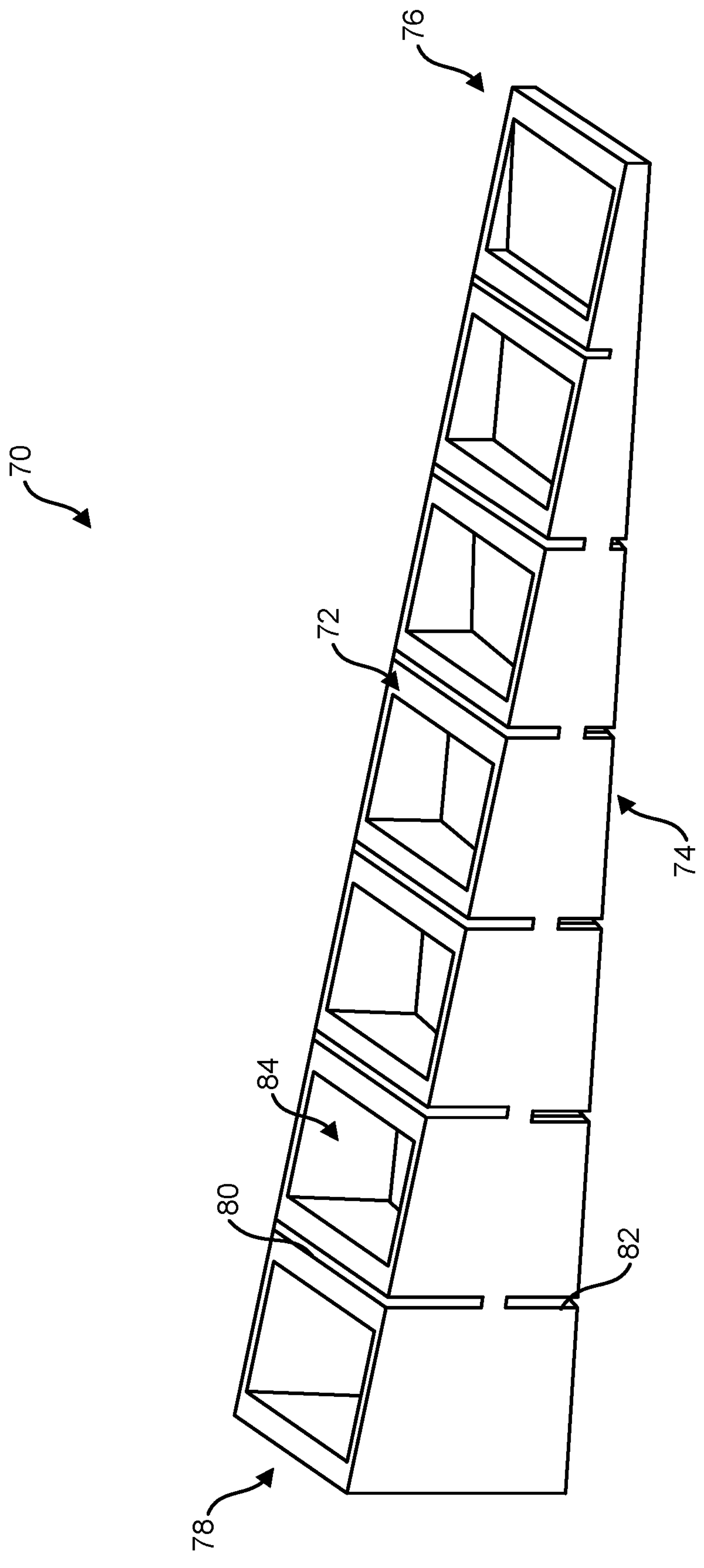
FIG. 14 isometric view of a shim, according to some examples

FIG. 14 is an isometric view of a shim 70 optionally employed for shimming the unit 10, or any other fenestration unit as desired. The shim 70 defines a top 72, a bottom 74, a nose 76, and a heel 78. As shown, the shim 70 includes a series of opposing upper grooves 80 formed into the top 72 and lower grooves 82 formed into the bottom 74 of the shim 70. The opposing upper grooves 80 and lower grooves 82 provide pre-selected break points for the shim 70 to facilitate breaking the shim at a desired length during a shimming procedure. The groves 80 and 82 are positioned on opposing sides of hollows 84 formed into the top 72 of the shim 70 that save material and reduce weight of the design. The top and the bottom 72 and 74 are angled with regard to one another such that the angle, or incline of the shim can be relatively steeper than standard shims (e.g., compare approximately 2 degrees for a standard shim to approximately 9.5 degrees according to some shim designs disclosed herein). Any of a variety of inclines are contemplated, such as greater than 5, 6, 7, 8, 10, 20 degrees, any value in between, or any range in between the afore-mentioned examples. In some examples, the shim 70 has dimensions of 0.5 inches in height, 3 inches in length, and 1 inch in width.

In examples, the base and flip-up bracket are located such that structural anchoring is sufficient for the products desired performance rating. For example, two or more brackets located near each lower corner on the sill may provide the space needed to allow proper moisture management as well as provide means to shim up one or both sides to accomplish plumb/level product after set within the rough opening. Additional brackets may located at each checkrail for double hung as well as near the upper corners of all products on each jamb.

The incline towards the interior of the base's shim receiver may allow for self-centering of the product within the rough opening. This may eliminate the need for an additional person/labor needed within the interior of the building to assist with centering or shimming of products. The gap in the flip up bracket and the base's shim receiver may allow for the insertion of a wedge shim from the exterior. This may allow for easier product leveling using the product's frame as a guide, and may eliminate the need for the interior person/laborer. The isolated flip up bracket anchor method may reduce the number of anchor fastening required around the entire perimeter when compared to a standard nailing flange installation of similar product. In examples, a longer base with dual shim locations and flip up brackets may serve as a mullion end reinforcement plate and means of mullion anchoring to the rough opening. A longer flip up bracket in examples could also allow anchoring with factory applied brickmould, and may eliminate the need to remove 3½" brickmould in the field to properly anchor mullion ends. For block frame installation methods that utilize masonry installation clips, the base and flip up bracket could be reversed, allow for insertion of the product from the interior/within the building. A longer, modified flip up bracket could then be anchored into the opening (similar to installation clip anchoring in either straight or bent condition).

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features. Accordingly, the scope of the present disclosure is intended to embrace all such alternatives, modifications, and variations as fall within the scope of the claims, together with all equivalents thereof

What is claimed is:

1. A method for installing a fenestration unit including a frame into a rough opening of a structure, comprising:

inserting the fenestration unit into the rough opening of the structure, including inserting an installation bracket comprising a base and a deflectable tongue coupled to the base between the frame and the structure, wherein the deflectable tongue defines a shim receiver gap extending between an interior-facing side and an exterior-facing side of the installation bracket;

shimming the fenestration unit in the rough opening, including inserting a wedge shim between the frame and the deflectable tongue, and into the shim receiver gap, in a direction extending between the interior-facing side and the exterior-facing side to deflect the deflectable tongue toward and into contact with the structure; and anchoring the fenestration unit to the structure after inserting the wedge shim.

2. The method of claim 1 wherein inserting the wedge shim includes inserting the wedge shim from an exterior side of the structure.

3. The method of claim 2 wherein inserting the fenestration unit includes inserting the fenestration unit into the rough opening from an exterior side of the structure.

4. The method of claim 1 wherein inserting the wedge shim includes causing the deflectable tongue to hold the wedge shim.

5. The method of claim 1 wherein the installation bracket includes a leg deflectably coupling the deflectable tongue to the frame, and wherein inserting the wedge shim includes supporting the wedge shim on the leg.

6. The method of claim 1 wherein the installation bracket includes a fastening bracket, and wherein anchoring the fenestration unit to the structure includes fastening the fastening bracket to the structure.

7. The method of claim 1 wherein:

inserting the wedge shim comprises inserting a wedge shim including pre-selected break points along a length of the wedge shim; and the method further comprises breaking the wedge shim at one of the pre-selected break points after inserting the wedge shim.

* * * * *